United States Patent
Su et al.

(10) Patent No.: US 9,648,618 B2
(45) Date of Patent: *May 9, 2017

(54) MIXER SEQUENCE DESIGN FOR N-PATH FILTERS

(71) Applicant: TEXAS INSTRUMENTS INCORPORATED, Dallas, TX (US)

(72) Inventors: Guolong Su, Cambridge, MA (US); Arthur John Redfern, Plano, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/044,171

(22) Filed: Feb. 16, 2016

(65) Prior Publication Data
US 2016/0164555 A1 Jun. 9, 2016

Related U.S. Application Data

(63) Continuation of application No. 14/452,777, filed on Aug. 6, 2014, now Pat. No. 9,294,138.

(51) Int. Cl.
*H04B 1/10* (2006.01)
*H04W 72/04* (2009.01)
*H04B 17/336* (2015.01)

(52) U.S. Cl.
CPC ...... *H04W 72/0446* (2013.01); *H04B 17/336* (2015.01)

(58) Field of Classification Search
CPC ....................................................... H03M 3/30
USPC ........................................................ 375/350
See application file for complete search history.

(56) References Cited

U.S. PATENT DOCUMENTS

| 4,587,605 | A  | * | 5/1986  | Kouyama   | H02M 7/53873 318/811 |
| 9,294,138 | B2 | * | 3/2016  | Su        | H04B 17/336 |
| 2009/0296307 | A1 | * | 12/2009 | Siamak    | B81C 1/00246 361/281 |
| 2014/0043177 | A1 | * | 2/2014  | Pagnanelli | H03M 3/30 341/143 |

OTHER PUBLICATIONS

Fortgens, L.C.; "Approximation of an ideal bandpass filter with overlapping clocks and harmonic rejection," MSc. Thesis, Aug. 2012, Report No. 067.3465, 63 pages.
Y. Sun; "Network Functions of Quadrature N-Path Filters," IEEE Transactions on Circuit Theory, vol. CT-17, No. 4, Nov. 1970, 7 pages.

* cited by examiner

*Primary Examiner* — Lihong Yu
(74) *Attorney, Agent, or Firm* — John R. Pessetto; Charles A. Brill; Frank D. Cimino

(57) ABSTRACT

A bandpass filter includes a plurality of parallel paths. Each path includes a first mixer, a low-pass filter, and a second mixer. The first mixer in each path receives the input signal and mixes the input signal with a periodic mixer sequence. The low-pass filter in each path is operable to filter an output of the associated first mixer. The second mixer in each path is coupled to receive an output of the associated low-pass filter and mixes said filter output with a periodic mixer sequence having a period that is divided into a plurality of time slots, wherein again the mixer value is constant during each time slot. A summer sums the outputs of the second mixers of each of the paths to generate an output of the bandpass filter.

1 Claim, 4 Drawing Sheets

MIXER SEQUENCE DESIGN FOR N-PATH FILTERS

CROSS REFERENCE TO RELATED APPLICATIONS

This application is a continuation application which claims priority to U.S. patent application Ser. No. 14/452,777, filed Aug. 6, 2014, which is hereby incorporated herein by reference.

BACKGROUND

Bandpass filters are used in many applications including radio frequency receiver paths and bandpass delta-sigma analog-to-digital converters. Typical bandpass filter implementations require inductors, and it is difficult to implement high quality, appropriately sized, inductors in complementary metal oxide semiconductor (CMOS) processes. Other options exist for implementing bandpass filters, but they tend to have issues with performance and/or power, or require alternative process technologies.

N-path filters are a practical method for implementing high-Q bandpass filters in modern CMOS processes without inductors using a combination of mixers and low-pass filters. The Q factor is the ratio of the center frequency of the filter to the pass band bandwidth. The basic structure of an N-path filter is multiple paths, each path composed of a mixer, filter and mixer, summed together to form the filter output. With trends in process scaling leading to higher switching frequencies, N-path filters are a viable option for integrated bandpass filter designs with center frequencies of interest in current communication standards. As the center frequency of the filter is decoupled from the bandwidth of the filter, high Q values are achievable. The mixer sequences have a high impact on the performance of the N-path filter. Therefore optimizing practically realizable mixer sequences allows optimization of the N-path filter.

SUMMARY

A bandpass filter in accordance with one illustrative embodiment of the present invention includes a plurality of parallel paths, each receiving the input signal to the bandpass filter. Each path includes a first mixer, a low-pass filter, and a second mixer. The first mixer in each path is coupled to receive the input signal and mixes the input signal with a periodic mixer sequence having a period that is divided into a plurality of time slots. The mixer value is constant during each time slot. The low-pass filter in each path is operable to filter an output of the associated first mixer. The second mixer in each path is coupled to receive an output of the associated low-pass filter and mixes said filter output with a periodic mixer sequence having a period that is divided into a plurality of time slots, wherein again the mixer value is constant during each time slot. A summer sums the outputs of the second mixers of each of the paths to generate an output of the bandpass filter.

Another embodiment of the invention is directed to a bandpass filter that includes a first path and a second path. The first path includes a first mixer, a first low-pass filter, and a second mixer. The first mixer mixes an input signal with a sampled cosine signal to produce a first mixed signal. The first low-pass filter is operable to low-pass filter the first mixed signal to produce a first filtered signal. The second mixer mixes the first filtered signal with the sampled cosine signal to produce a second mixed signal. The second path includes a third mixer, a second low-pass filter, and a fourth mixer. The third mixer mixes the input signal with a sampled sine signal to produce a third mixed signal. The second low-pass filter low-pass filters the third mixed signal to produce a second filtered signal. The fourth mixer mixes the second filtered signal with the sampled sine signal to produce a fourth mixed signal. A summer sums the second mixed signal and the fourth mixed signal to produce an output of the bandpass filter.

Another embodiment of the invention is directed to a bandpass filter that has N parallel paths, each path arranged to receive the input signal to the bandpass filter. Each path includes a first mixer, a low-pass filter, and a second mixer. The first mixer in each path is coupled to receive the input signal and mixes the input signal with a periodic two-level mixer sequence having a period of length T that is divided into M time slots, where M is an integer greater than one. The mixer value is constant during each time slot. Assume M is an even number. The number of paths N is greater than or equal to M/2. Only the first M/2 paths are active, where the mixer sequence p of the first mixer of the $n^{th}$ path ($1 \leq n \leq M/2$) is chosen to satisfy $$p^{(n)}(t) = p^{(1)}\left(t - \frac{(n-1)T}{M}\right) \text{ and}$$

$$p^{(1)}\left(t + \frac{T}{2}\right) = -p^{(1)}(t).$$

The low-pass filter in each path is operable to filter an output of the associated first mixer. The second mixer in each path is coupled to receive an output of the associated low-pass filter and mix said filter output with a periodic two-level mixer sequence having a period of length T that is divided into M time slots. The mixer value is constant during each time slot. The mixer sequence q of the second mixer of the $n^{th}$ path ($1 \leq n \leq M/2$) is chosen to satisfy $$q^{(n)}(t) = q^{(1)}\left(t - \frac{(n-1)T}{M}\right).$$

A summer sums the outputs of the second mixers of each of the paths to generate an output of the bandpass filter.

DETAILED DESCRIPTION

The present invention is directed generally to an N-path bandpass filter having mixer sequences that are constrained to a staircase sequence and to a two-level sequence.

Figure 1:
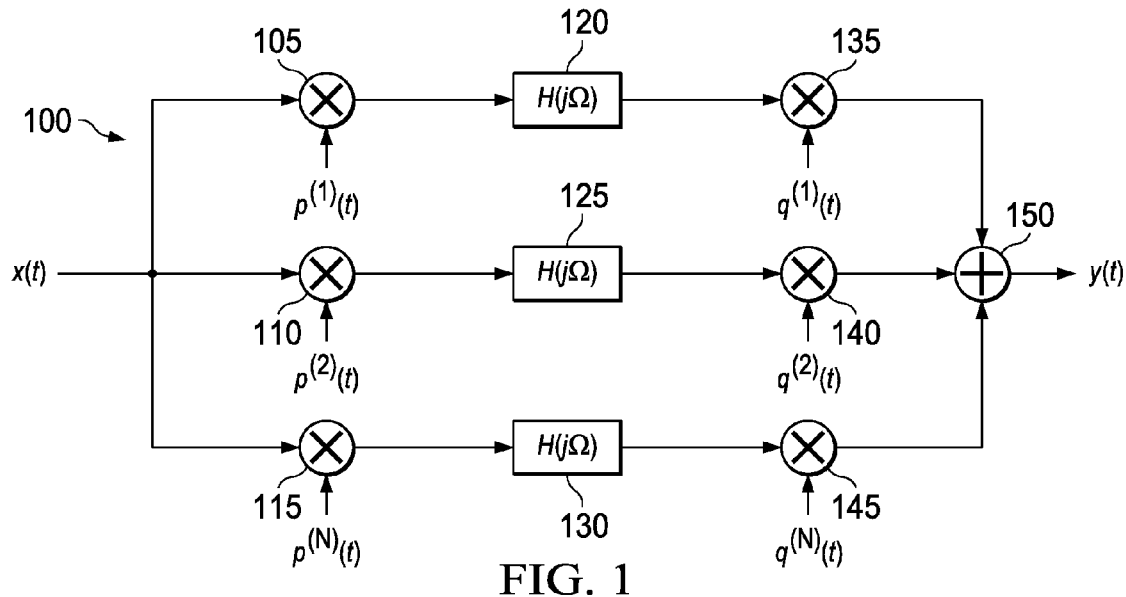
FIG. 1 is a schematic diagram of an N-path filter.

FIG. 1 is a schematic diagram of an N-path bandpass filter 100. The first path includes a mixer 105, a low-pass filter 120, and a second mixer 135. The second path includes a mixer 110, a low-pass filter 125, and a second mixer 140. The $N^{th}$ path includes a mixer 115, a low-pass filter 130, and a second mixer 145. The first mixers 105, 110, 115 in each path have a mixer signal $p^{(n)}(t)$, and the second mixers 135, 140, 145 in each path have a mixer signal $q^{(n)}(t)$. The mixers have a period T which determines the center frequency $\Omega_0 = 2\pi/T$ of the bandpass filter. The products of each path are summed together by summer 150 to form the filter output. The mixers transform the low-pass filter shape to a pass band around $\Omega_0$, where the double-sided bandwidth of the low-pass filter is the same as the bandwidth of the bandpass filter. In an illustrative embodiment, the N-path filter 100 is implemented in complementary metal-oxide-semiconductor (CMOS) integrated circuit(s). But other technologies, including other semiconductor technologies, can be used as well.

It can be shown mathematically that the N-path filter 100 transforms a low-pass-filter into a bandpass filter. Defining $X(j\Omega)$ as the input and $Y(j\Omega)$ as the output spectrum of the N-path filter, and denoting $H(j\Omega)$ as the low-pass filter, the output of the N-path filter can be represented as:

$$Y(j\Omega) = \sum_{r=-\infty}^{\infty} H(j(\Omega - r\Omega_0)) \cdot Y_r(j\Omega), \quad (1)$$

in which the input and mixer related terms are $$Y_r(j\Omega) = \sum_{m=-\infty}^{\infty} X(j(\Omega + (m-r)\Omega_0)) \cdot \alpha(m, r), \quad (2)$$

and $$\alpha(m, r) = \sum_{n=1}^{N} \hat{p}_{-m}^{(n)} \cdot \hat{q}_r^{(n)} = \sum_{n=1}^{N} (\hat{p}_m^{(n)})^* \cdot \hat{q}_r^{(n)}, \quad (3)$$

where $\hat{p}_m^{(n)}$ and $\hat{q}_m^{(n)}$ are the $m^{th}$ Fourier series coefficients of $p^n(t)$ and $q^n(t)$, respectively. Typically, the bandwidth $BW \ll \Omega_0$ and Eq. (1) implies that the output only has significant power in frequencies $\pm BW/2$ around the harmonics of $\Omega_0$.

For simplicity, it can be assumed that the power is flat in frequencies $\pm BW/2$ around a harmonic, so only the midpoint of each band (i.e., $Y(j \cdot l\Omega_0)$) is considered. When $\Omega = l\Omega_0$ in Eq. (1), only the r=l term remains. Since H(j0) is the same scale factor for all harmonics, let H(j0)=1 to obtain $$Y(j \cdot l\Omega_0) \approx \sum_{m=-\infty}^{\infty} X(j \cdot m\Omega_0) \cdot \alpha(m, l). \quad (4)$$

$\alpha(m,l)$ can be viewed as the transfer coefficient from the $m^{th}$ harmonic in the input to the $l^{th}$ harmonic in the output.

It can further be assumed for simplicity's sake that the stationary input signals at different harmonics are uncorrelated and both $X(j \cdot m\Omega_0)$ and $X^2(j \cdot m\Omega_0)$ have zero mean. Denoting $E\{\cdot\}$ as the average operator, the output signal power spectral density (PSD) at the $l^{th}$ harmonic is:

$$E\{|Y(j \cdot l\Omega_0)|^2\} \approx \sum_{m=-\infty}^{\infty} E\{|X(j \cdot m\Omega_0)|^2\} \cdot |\alpha(m, l)|^2. \quad (5)$$

The in-band output corresponds to l=1 and has two components: the in-band signal and the folded harmonic. The desired in-band signal, which is the output of a traditional bandpass filter, corresponds to the term l=m=1 and has average power $$P_{signal} = E\{|X(j\Omega_0)|^2\} \cdot |\alpha(1,1)|^2. \quad (6)$$

The unwanted folded harmonics can be viewed as interference to the in-band signal. They correspond to terms with l=1, m≠1 in (4) and have average total power $$P_{folded} = \sum_{m \neq 1} E\{|X(j \cdot m\Omega_0)|^2\} \cdot |\alpha(m, 1)|^2. \quad (7)$$

In addition to the in-band output, the N-path filter typically has out-of-pass-band outputs around the harmonics of $\Omega_0$. For the $l^{th}$ harmonic (l≠±1), the average out-of-band power is $$P_{out}(l) = \sum_{m=-\infty}^{\infty} E\{|X(j \cdot m\Omega_0)|^2\} \cdot |\alpha(m, l)|^2. \quad (8)$$

Figure 2:
FIG. 2 is a schematic diagram of a bandpass filter comprising an N-path filter.

The above analysis shows that the N-path filter transforms a low-pass filter to a bandpass filter with two nonidealities: in-band harmonic folding and out-of-band signal residue. FIG. 2 shows a bandpass filter arrangement 200 that reduces these two nonideal effects. The bandpass filter 200 employs a loose pre-low-pass filter 210 and a loose post-low-pass filter 230 around the N-path filter 220, such as the N-path filter 100 of FIG. 1. With cutoff frequencies a little above $\Omega_0$, the pre-low-pass filter 210 attenuates signals at high harmonics to avoid folding onto the in-band signal and the post-low-pass filter 230 removes residual out-of-band signal power.

Alternatively, as $\alpha(m,l)$ in Eqs. (6-8) depends on the Fourier coefficients of the mixer signals, it's possible to design mixer signals that reduce the in-band harmonic folding and the out-of-band signal residue such that the requirements on the pre and post low-pass filters 210 and 230 are reduced or eliminated. The design of the mixer sequences $p^{(n)}(t)$ of the mixers 105, 110, 115, and the mixer sequences $q^{(n)}(t)$ of the mixers 135, 140, 145 for this purpose is explored below.

Figure 3:
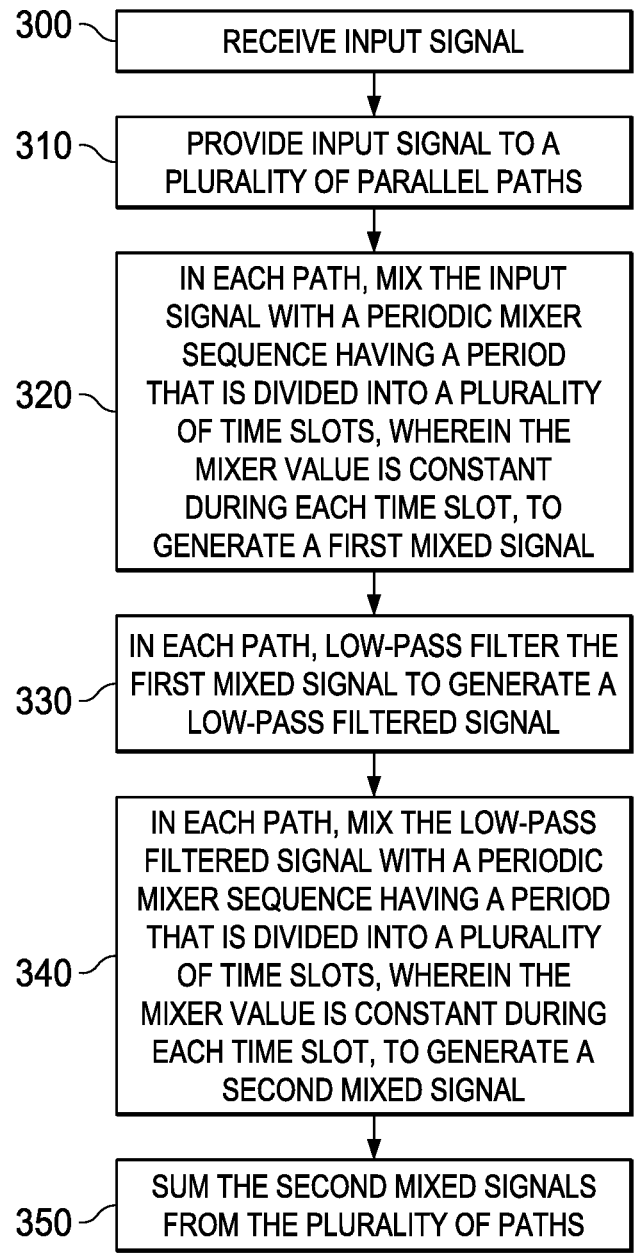
FIG. 3 is a flow chart representing a method of bandpass filtering an input signal using an N-path filter that employs mixers that have periodic staircase mixer sequences.

In an illustrative embodiment of the present invention, the mixer sequences $p^{(n)}(t)$ of the mixers 105, 110, 115, and the mixer sequences $q^{(n)}(t)$ of the mixers 135, 140, 145 have periodic staircase sequences. Each period is split into M equal time slots and each mixer value is constant within each time slot. FIG. 3 is a flow-chart representing a method of bandpass filtering an input signal using an N-path filter that employs mixers that have periodic staircase mixer sequences. At block 300, an input signal, such as signal x(t) shown in FIG. 1, is received. At block 310, the input signal is provided to each of a plurality of parallel paths. Each path includes a first mixer, a low-pass filter, and a second mixer. At block 320, in each path, the first mixer 105, 100, 115 mixes the input signal with a periodic mixer sequence having a period that is divided into a plurality of time slots. The mixer value is constant during each time slot. At block 330, the low-pass filter 120, 125, 130 in each path low-pass filters the output of the associated first mixer 105, 110, 115. At block 340, the second mixer 135, 140, 145 in each path receives the output of the associated low-pass filter and mixes said filter output with a periodic mixer sequence having a period that is divided into a plurality of time slots, wherein the mixer value is constant during each time slot. At block 350, the summer 150 sums the outputs of the second mixers 135, 140, 145 of each of the paths to generate an output of the bandpass filter.

For purposes of the present invention, two criteria are considered in evaluating N-path filters: in-band signal-to-noise ratio (SNR) and out-of-band harmonic power ratio. If the folded harmonics are considered as in-band noise, then the goal is to maximize the in-band $SNR=P_{signal}/P_{folded}$. Regarding the out-harmonic power ratio, for $l \neq \pm 1$, the goal is to minimize $R_{out}(l)=P_{out}(l)/P_{signal}$.

The following lemma and corollary, which put an upper limit on the achievable in-band SNR and a lower limit on the out-of-band harmonic power ratio, are used in design of the mixer sequences $p^{(n)}(t)$ of the mixers 105, 110, 115, and the mixer sequences $q^{(n)}(t)$ of the mixers 135, 140, 145. The lemma states that, for M-slot staircase mixer sequences, the harmonic power ratio for the lth harmonic is lower bounded by $$R_{out}(l) = P_{out}(l)/P_{signal} \geq \qquad (9)$$

$$\begin{cases} \sum_{b=-\infty}^{\infty} \frac{E\{|X(j(bM+1)\Omega_0)|^2\}}{(l(bM+1))^2 \cdot E\{|X(j\Omega_0)|^2\}}, & \text{for } l = cM+1 \\ \sum_{b=-\infty}^{\infty} \frac{E\{|X(j(bM-1)\Omega_0)|^2\}}{(l(bM-1))^2 \cdot E\{|X(j\Omega_0)|^2\}}, & \text{for } l = cM-1 \\ 0, & \text{otherwise} \end{cases}$$

and the lower bound is achieved if $$\alpha(m,l)=0, \text{ for } 0 \leq m < M, 0 \leq l < M,$$

except for $(m,l)=(1,1)$ or $(M-1, M-1)$.  (10)

The ratio $\alpha(bM+1, cM+1)/a(1,1)$ is independent of the input, where $a(1,1)$ controls $P_{signal}$ and $\alpha(bM+1, cM+1)$ controls the power contributed from the $(bM+1)^{th}$ input harmonic to $P_{out}$ $(cM+1)$. The bound is achieved when no other input harmonics contribute to the $(cM+1)^{th}$ output harmonic. The case $l=cM-1$ is due to spectrum symmetry. Setting $l=1$ in the lemma leads to the corollary: with M-slot staircase mixer sequences, the in-band signal-to-noise ratio is upper bounded by $$SNR \leq \frac{E\{|X(j\Omega_0)|^2\}}{\sum_{b \neq 0} \frac{E\{|X(j(bM+1)\Omega_0)|^2\}}{(bM+1)^2}}, \qquad (11)$$

and the upper bound is achieved if $$\alpha(m,1)=0, \text{ for } m \neq 1, 0 \leq m < M. \qquad (12)$$

Staircase Sequences

In one illustrative embodiment of the M-slot staircase mixer sequences of the present invention, the signal amplitude can vary from time slot to time slot and from path to path, and there is no constraint on the relationship between the mixer signals on different paths or the number of paths N. In this scenario, a two-path sampled quadrature filter achieves both the optimal in band signal-to-noise ratio and the optimal harmonic power ratio at each harmonic frequency, among all N-path filters with M-slot staircase mixer sequences. In the period [0,T], the mixer sequences in the two-path sampled quadrature filter have values $$p^{(1)}(t)=q^{(1)}(t)=\cos(2\pi m/M)$$

$$p^{(2)}(t)=q^{(2)}(t)=\sin(2\pi m/M) \qquad (13)$$

where $(mT/M) \leq t < ((m+1)T/M)$ and $0 \leq m \leq M-1$.

Thus a bandpass filter according to this embodiment comprises just two paths. Referring again to FIG. 1, such a two-path filter would include a first path comprising first mixer 105, low-pass filter 120, and second mixer 135, and a second path comprising first mixer 110, low-pass filter 125, and second mixer 140. Both mixers 105 and 135 in the first path utilize a mixer sequence comprising a sampled cosine signal. Both mixers 110 and 140 in the second path utilize a mixer sequence comprising a sampled sine signal.

To prove that this two-path scheme employing sampled sine and cosine mixer sequences is the optimal N-path filter that uses periodic staircase mixer sequences, it is necessary only to test whether the sequences of (13) satisfy (10) and (12). Note that for $0 < m < M-1$, the only nonzero terms of Fourier series coefficients of $p^{(n)}(t)$ and $q^{(n)}(t)$ in (13) are $\hat{p}_1^{(n)}, \hat{p}_{M-1}^{(n)}, \hat{q}_1^{(n)},$ and $\hat{q}_{M-1}^{(n)}$. Thus, for $0 \leq m, 1 \leq M-1$, the only possible nonzero terms of $\alpha(m, l)$ are $\alpha(1, 1)$, $\alpha(1, M-1)$, $\alpha(M-1, 1)$ and $\alpha(M-1, M-1)$. Direct calculation can verify that $\alpha(1, M-1)=\alpha(M-1, 1)=0$. As such, (10) is satisfied and the minimum harmonic power ratio at each harmonic is achieved.

Constraint (12) for the optimal in-band signal-to-noise ratio is a special case of (10) with $l=1$ which is already satisfied. Thus, the sampled sine and cosine mixer signals of (13) achieve both maximum in-band signal-to-noise ratio and minimum harmonic power ratio at each harmonic.

Figure 4:
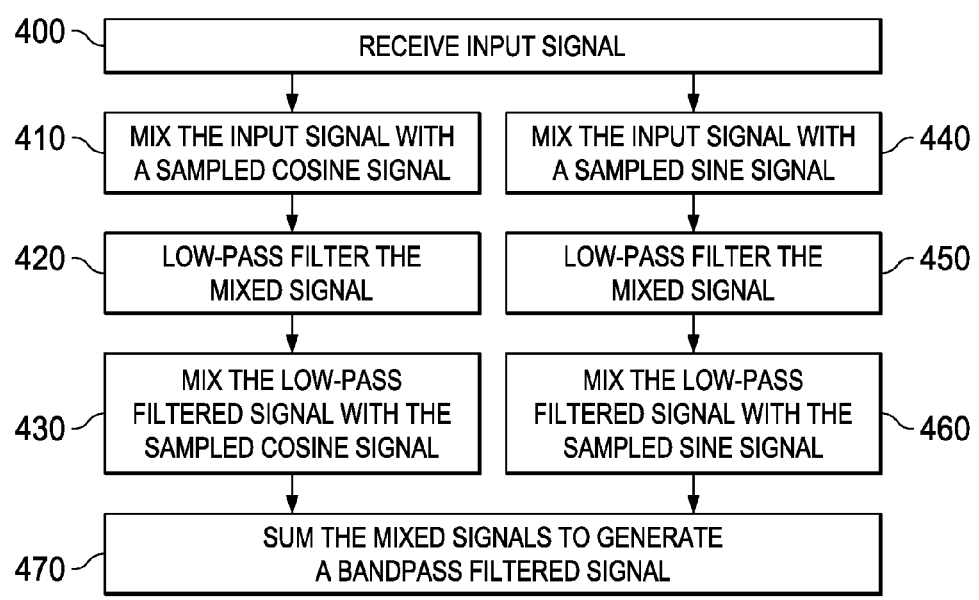
FIG. 4 is a flow chart representing a method of bandpass filtering an input signal using an N-path filter that employs mixers that use periodic sampled sine and cosine mixer sequences.

FIG. 4 is a flow-chart representing a method of bandpass filtering an input signal using an N-path filter that employs mixers that use sampled sine and cosine mixer sequences. At block 400, an input signal, such as signal x(t) shown in FIG. 1, is received. The input signal is provided to a first path and a second path. The first path, represented by blocks 410, 420 and 430, includes a first mixer, a low-pass filter, and a second mixer. At block 410, the first mixer mixes the input signal with a sampled cosine signal to produce a mixed signal. At block 420, the low-pass filter low-pass filters the mixed signal to produce a low-pass filtered signal. At block 430, the second mixer mixes the low-pass filtered signal with the sampled cosine signal to produce a second mixed signal. The second path, represented by blocks 440, 450 and 460, also includes a mixer, a low-pass filter, and a second mixer. At block 440, the second path's first mixer mixes the input signal with a sampled sine signal to produce a mixed signal. At block 450, the low-pass filter filters the mixed signal to produce a low-pass filtered signal. At block 460, the second mixer of the second path mixes the low-pass filtered signal with the sampled sine signal to produce a second mixed signal. At block 470, a summer sums the mixed signal received from the first and second paths to produce an output of the bandpass filter.

It is noted that, if the mixers of the N-path filter such as that shown in FIG. 1 are constrained to staircase sequences, then adding more than two paths does not provide a gain for in-band signal-to noise-ratio or out-of-band signal rejection. Also, the optimal mixer sequences are independent of the power spectral density (PSD) of the input signal and the location of any blockers. Improving the in-band signal-to-noise ratio and out-of-band signal rejection requires an increase of the number of time slots M in one period, i.e., the system has to run at a higher clock frequency.

Two-Level Sequences

In another illustrative embodiment of the M-slot staircase mixer sequences of the present invention, the mixer sequences are further constrained to taking on one of only two values in each of the M slots. Thus:

$$p^{(n)}(t) \in \{1,-1\}, \quad q^{(n)}(t) \in \{A_n,-A_n\}, \tag{14}$$

where $A_n$ is a constant gain for the $n^{th}$ path. Limiting the mixers to two levels makes them easier to implement in analog.

In the following design, it is assumed for the sake of simplicity of explanation that M is an even number. If M is odd, the results are similar as will be explicitly described subsequently. For an even M the cases of N≥M/2 and N<M/2 paths are separately considered. Additionally, only the in-band signal-to-noise ratio criterion is considered in the analysis of the two-level sequences.

Two-Level Sequences with N≥M/2 Paths

Among N-path filters whose mixer sequences have M slots per period and are constrained to taking on one of only two values in each of the M slots, the M/2-path filter with the following class of mixer sequences achieves the optimal in-band signal-to-noise ratio:

$$p^{(n)}(t) = p^{(1)}(t-((n-1)T/M)), \tag{15}$$

$$q^{(n)}(t) = q^{(1)}(t-((n-1)T/M)), \tag{16}$$

$$p^{(1)}(t+(T/2)) = -p^{(1)}(t). \tag{17}$$

The antisymmetric condition of Eq. (17) indicates that $p^{(n)}(t)$ has no even harmonics. Thus $\hat{p}_{2m}^{(n)}=0$ and $\alpha(2m, 1)=0$. The delay relationships in Eqs. (15) and (16) result in a phase factor in the Fourier series coefficients and it can be verified that $\alpha(2m+1, 1)=0$ for $1 \le m < M/2$. Thus, (12) is satisfied and the optimal in-band SNR is achieved.

In particular, the half-plus half-minus (HPHM) sequences $$p^{(1)}(t) = \begin{cases} 1, & 0 \le t < (T/2), \\ -1, & (T/2) \le t < T, \end{cases} \tag{18}$$

$$p^{(n)}(t) = p^{(1)}(t - ((n-1)T/M)), \tag{19}$$

$$q^{(n)}(t) = p^{(n)}(t) \tag{20}$$

satisfy the constraints of (15-17) and have optimal in-band SNR. These sequences are particularly implementation friendly as there are only two level changes in one period in each path, and mixer sequences in consecutive paths have a delay of one slot.

Figure 5:
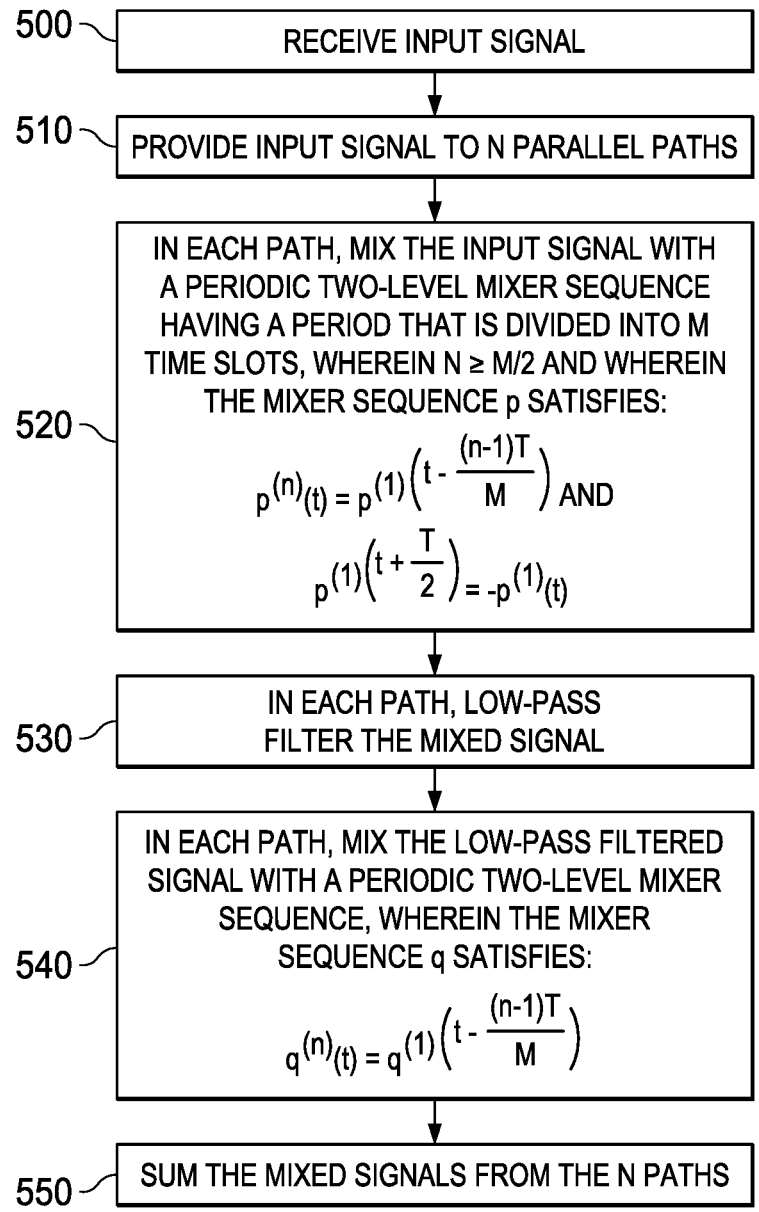
FIG. 5 is a flow chart representing a method of bandpass filtering an input signal using an N-path filter that employs mixers that use two-level periodic mixer sequences and N≥M/2, where M is the number of slots in each period of the mixer sequences.

FIG. 5 is a flow-chart representing a method of bandpass filtering an input signal using an N-path filter that employs mixers that use two-level mixer sequences. At block 500, an input signal, such as signal x(t) shown in FIG. 1, is received.

At block 510, the input signal is provided to each of a plurality of parallel paths. Each path includes a first mixer, a low-pass filter, and a second mixer. At block 520, in each path, the first mixer 105, 100, 115 mixes the input signal with a periodic two-level mixer sequence having a period that is divided into M time slots, wherein N≥M/2. The mixer value is constant during each time slot and the mixer sequence p satisfies Eq. (15) and Eq. (17). At block 530, the low-pass filter 120, 125, 130 in each path low-pass filters the output of the associated first mixer 105, 110, 115. At block 540, the second mixer 135, 140, 145 in each path receives the output of the associated low-pass filter and mixes said filter output with a periodic two-level mixer sequence having a period that is divided into M time slots, wherein the mixer value is constant during each time slot and wherein N≥M/2. The mixer sequence q satisfies Eq. (16). At block 550, the summer 150 sums the outputs of the second mixers 135, 140, 145 of each of the paths to generate an output of the bandpass filter.

It is noted that additional paths beyond M/2 do not provide a gain for in-band signal-to noise ratio. However, out-of-band signal rejection could potentially be improved. Additionally, the optimal sequences are independent of the input signal power spectral density.

Two-Level Sequences with N<M/2 Paths

N-path filters whose M-slot mixer sequences are constrained to taking on one of only two values in each of the M slots, and where the number of paths N is restricted to N<M/2, are now considered. Only the in-band signal-to-noise ratio criterion is considered in the analysis of these two-level sequences. In contrast to the previous results, an input signal independent mixer sequence is not obtained under these constraints. Instead, a heuristic optimization algorithm is proposed.

Let $v_k^{(n)}$ and $w_k^{(n)}$ represent the values in the kth time slot ($1 \le k \le M$) of the mixer sequences $p^{(n)}(t)$ and $q^{(n)}(t)$, respectively. The in band signal-to-noise ratio has the form of $$SNR = \frac{E\{|X(j\Omega_0)|^2\} \cdot |\alpha(1, 1)|^2}{\sum_{m \ne 1} E\{|X(j \cdot m\Omega_0)|^2\} \cdot |\alpha(m, 1)|^2}. \tag{21}$$

Since the Fourier coefficients $\hat{p}_m^{(n)}$ and $\hat{q}_1^{(n)}$ are linear in the values of $v_k^{(n)}$ and $w_k^{(n)}$, respectively, $\alpha(m, 1)$ is a bilinear form with respect to $v_k^{(n)}$ and $w_k^{(n)}$. Therefore, the powers of the signal and folded harmonic are both quadratic forms with respect to either $v_k^{(n)}$ and $w_k^{(n)}$. The total order of 4 is a challenge for optimizing the signal-to-noise ratio per Eq. (21).

To reduce the order of the objective function, an iterative two-part heuristic algorithm is used. The first part (i.e., part 1) optimizes over $v_k^{(n)}$ with $w_k^{(n)}$ held constant. The second part (i.e., part 2) optimizes over $w_k^{(n)}$ with $v_k^{(n)}$ held constant.

The optimization problem of part 1 can be written as $$\max_{v \in \{-1,1\}^{MN}} SNR = \frac{v^T S v}{v^T N v}, \tag{22}$$

where S and N are positive semidefinite matrices dependent on N, M, $w_k^{(n)}$, and the input signal power spectral density $E\{|X(j \cdot m\Omega_0)|^2\}$. If $Nv \ne 0$ for all "binary" v vectors, it can be shown that the optimal objective function of Eq. (22) has the value of $\lambda$ and only if the following problem $$\max_{v \in \{-1,1\}^{MN}} (v^T S v - \lambda \cdot v^T N v) \quad (23)$$

has a maximum of 0. Problem (23) is an unconstrained binary quadratic programming problem and can be approximately solved by greedy local search. The solution of (23) never decreases signal-to-noise ratio, which typically leads to convergence. Thus, the optimization problem in part 1 can be heuristically solved by an iterative algorithm.

Figure 6:
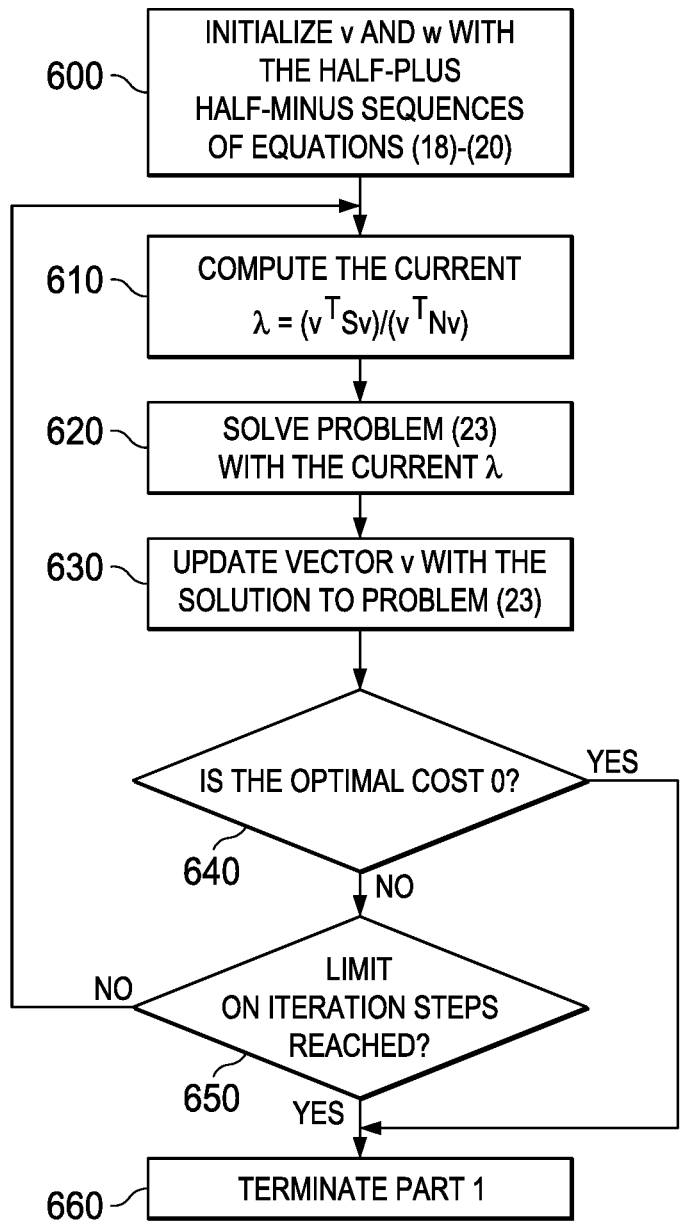
FIG. 6 is a flow chart representing a method of bandpass filtering an input signal using an N-path filter that employs mixers that use two-level periodic mixer sequences and N<M/2, where M is the number of slots in each period of the mixer sequences.

FIG. 6 is a flow chart representing the first part of the iterative heuristic algorithm according to an illustrative embodiment of the present invention. At block 600, the vectors v and w are initialized with the half-plus half-minus sequences of (18)-(20). At block 610, the current is computed as $\lambda = (v^T S v)/(v^T N v)$. At block 620, problem (23) is solved with the current $\lambda$. At block 630, the vector v is updated with the solution to problem (23). At decision block 640, it is determined if the optimal cost is zero. If the optimal cost is zero, part 1 of the heuristic algorithm terminates, as shown at block 660. If the optimal cost is not zero, it is determined whether the limit on iteration steps has been reached at decision block 650. If the limit on iteration steps is reached, then part 1 of the heuristic algorithm terminates at block 660. If the limit on iteration steps is not reached, the algorithm is repeated starting at block 610.

For the second part of the heuristic algorithm, since the in-band signal-to-noise ratio involves only $\hat{q}_1^{(n)}$, the optimization is performed on $[\hat{q}_1^{(1)}, \ldots, \hat{q}_1^{(N)}] \in \mathbb{C}^N$. Equation (21) is the ratio of semidefinate quadratic forms with respect to $\hat{q}_1^{(n)}$, hence, its solution is available in closed form. After solving for the optimal $\hat{q}_1^{(n)}$, its phase is quantized into delays which are multiples of T/M.

The two parts of the algorithm may take multiple iterations to determine a heuristic-based optimal solution for the two-level mixer sequences in each path. There are potentially local maximums and no guarantees of global optimality are provided. In contrast to the staircase mixer sequence or two-level sequence with N≥M/2 paths, the optimal sequence in the case N<M/2 paths depends on the input signal and the number of paths.

In the above analysis of the two-level sequences, the number of time slots per period M is assumed an even number. If M is odd, the derivation is very similar and thus omitted. However, there are differences in certain conclusions, which are stated as follows. For an odd M, the cases of N≥M and N<M paths are separately considered. If N≥M, then the M-path filter with sequences satisfying Eq. (15) and (16) achieves the maximum in-band signal-to-noise ratio among all N-path filters with M-slot two-level mixer sequences. This optimum is independent of the input signal power spectral density; furthermore, additional paths beyond M does not improve in-band signal-to-noise ratio. In contrast, if N<M, the optimal sequences can be obtained by the heuristic optimization algorithm previously discussed. In this case, the optimal sequences depend on the input signal and the number of paths.

Having thus described circuits and methods for implementing an N-path bandpass filter by reference to certain of its preferred embodiments, it is noted that the embodiments disclosed are illustrative rather than limiting in nature and that a wide range of variations, modifications, changes, and substitutions are contemplated in the foregoing disclosure. For example, in an illustrative embodiment of the invention, the N-path filter 100 is implemented in complementary metal-oxide-semiconductor (CMOS) integrated circuit(s), but other technologies, including other semiconductor technologies, can be used as well. Furthermore, in some instances, some features of the present invention may be employed without a corresponding use of the other features. Accordingly, it is appropriate that the appended claims be construed broadly and in a manner consistent with the broad inventive concepts disclosed herein.

What is claimed is:

1. A bandpass filter comprising:
   two parallel paths, each path arranged to receive an input signal to the bandpass filter, each path comprising:
      a first mixer coupled to receive the input signal and operable to mix the input signal with a periodic mixer sequence having a period that is divided into a plurality of time slots, wherein a first mixer value is constant during each time slot;
      a low-pass filter operable to filter an output of the first mixer; and
      a second mixer coupled to receive an output of the low-pass filter and operable to mix the low-pass filter output with a periodic mixer sequence having a period that is divided into a plurality of time slots, wherein a second mixer value is constant during each time slot; and
   a summer operable to sum the outputs of the second mixer of each path to generate an output of the bandpass filter;
   wherein the mixer sequences of the first and second mixers of each path have periods that are divided into M time slots, where M is an integer greater than one, wherein the mixer values within each period of the mixer sequences of a first of the two parallel paths are defined by $\cos(2\pi m/M)$, and wherein the first and second mixer values within each period of the mixer sequences of a second of the two parallel paths are defined by $\sin(2\pi m/M)$;
   wherein m is an integer value.

* * * * *